United States Patent [19]
Babut et al.

[11] 3,769,931
[45] Nov. 6, 1973

[54] LOW OVERHEAD WARNING DEVICE

[76] Inventors: John S. Babut, 2242 North Southport Ave., Chicago 60614; Stanley J. Morek, 1302 Spring Beach Rd., Cary 60013, both of Ill.

[22] Filed: Jan. 3, 1972

[21] Appl. No.: 214,544

[52] U.S. Cl.............. 116/28 R, 200/61.44, 248/207, 340/61, 343/892
[51] Int. Cl. ................................................. B60q
[58] Field of Search..................... 116/28, 114, 132, 116/173, 174, 175; 340/61; 200/61.44; 287/125, 117, 128; 248/38, 39, 40, 41, 42, 205, 207; 343/892, 900

[56] References Cited
UNITED STATES PATENTS

| 36,181 | 8/1862 | Trowbridge | 287/117 |
|---|---|---|---|
| 2,193,747 | 3/1940 | Thompson | 116/173 X |
| 2,411,095 | 11/1946 | Kiser | 116/175 |
| 2,554,371 | 5/1951 | Marx | 340/61 |
| 2,646,240 | 7/1953 | Anderson | 248/207 |
| 2,834,002 | 5/1958 | Nordsiek | 340/61 |
| 3,037,187 | 5/1962 | Blakistone | 116/28 R |
| 3,137,267 | 6/1964 | Hurt | 116/28 R |
| 3,232,265 | 2/1966 | Hurt | 116/28 R |
| 2,641,686 | 6/1953 | Carruthers | 116/28 R |

*Primary Examiner*—Louis J. Capozi
*Attorney*—Howard H. Darbo et al.

[57] ABSTRACT

At one side of the front of a truck body a mounting plate is affixed to the body and spaced therefrom. A one-quarter inch steel rod has its proximal end secured to the plate. The rod angles upwardly and forwardly above the truck cab. The distal end of the rod is vertically upward and supports a steel wire feeler which extends to an elevation above the top of the truck body. A corresponding construction is affixed to the other side of the front of the truck body.

3 Claims, 4 Drawing Figures

PATENTED NOV 6 1973

3,769,931

Inventors:
John S. Babut
Stanley J. Morek

By Darbo, Robertson, & Vandenburgh
Attys.

LOW OVERHEAD WARNING DEVICE

BACKGROUND AND SUMMARY OF THE INVENTION

Many truck bodies extend vertically to a height such that there is a danger of striking overhead obstructions. Such obstructions might be the top of an underpass, the roof of a gasoline station, the top of a doorway into a garage, etc. Of course, if the truck body strikes such an obstruction damage will invariably result to the truck body and sometimes to the obstruction.

The principal object of the present invention is to provide a simplified warning device; yet, one which is relatively safe and dependable in operation.

Further objects and advantages will become apparent from the following description.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figure 1:
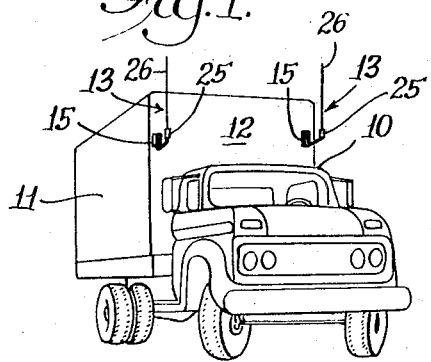
FIG. 1 is a perspective view of the front of a truck showing embodiments of the invention mounted thereon.
Figure 2:
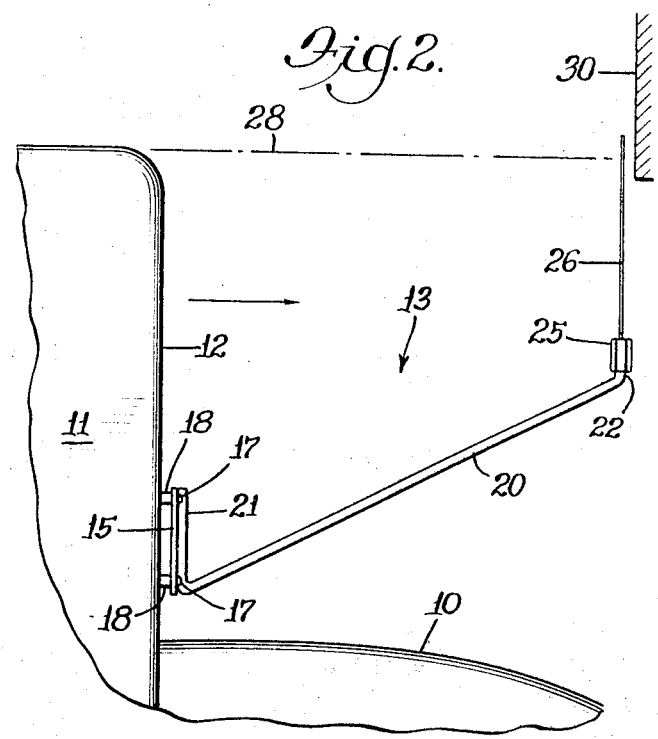
FIG. 2 is a side elevation of the embodiment of FIG. 1.
Figure 3:
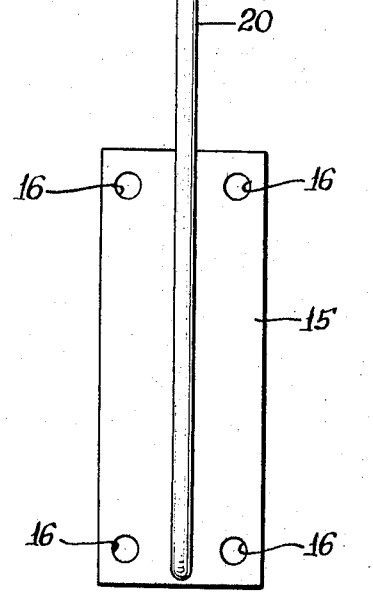
FIG. 3 is a front elevation of an embodiment not mounted.
Figure 4:
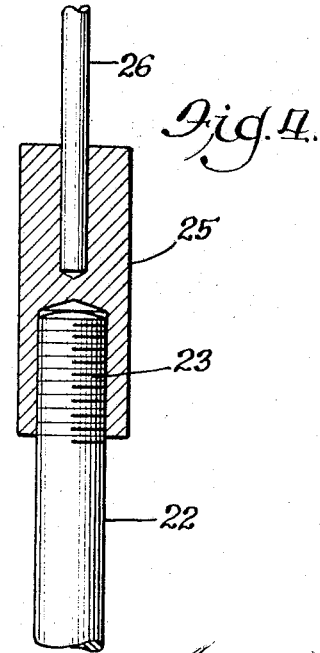
FIG. 4 is an enlarged partial section as viewed at line 4—4 of FIG. 3.

FIG. 1 illustrates a truck including a cab 10 and a body or enclosure 11 behind the (ab. On the front wall 12 of the body are two of the warning devices, generally 13, of the present invention. It is important that two be used since many of the overhead obstructions have curved or slanted sides. A single warning device positioned along the center line of the vehicle is inadequate protection. While the vehicle illustrated in FIG. 1 is representative of only one general style of truck, it will be apparent from the description herein that the invention can be employed in the protection of other types of vehicles, e.g. semi-trailers, campers, etc.

Each warning device 13 of the present invention comprises a mounting plate 15. This plate is elongated vertically. It has four openings 16 in the four corners thereof. These openings are to receive mounting screws or bolts 17 which affix the plate to the front wall 12 of the truck body. The bolts extend through tubular spacers 18 which are only slightly larger in diameter than the bolts 17, but bear against the back of plate 15 and the front of wall 12 to hold the plate a short distance from the wall.

An arm 20 has its proximal end 21 welded to the plate 15. The arm extends forwardly and upwardly. For example, in one specific embodiment it rises twelve inches from bottom to top and extends forward twenty four inches from plate 15. The distal end 22 of the arm extends vertically upward and is threaded as indicated at 23.

A connector or cap 25 has a threaded bottom opening to mate with threads 23. It has an upper vertical opening to receive a feeler 26. The feeler is secured to the connector as by means of brazing or welding. The exterior of the connector 25 is hexagonol. The feeler extends upwardly, in the specific embodiment mentioned, a distance of eighteen inches from cap 25.

The feeler 26 is relatively thin and flexible as compared to the arm 20. For example, it is 3/32 of an inch in diamter as compared to ¼ of an inch for the arm. The arm is formed of steel wire. The feeler is formed from spring steel wire.

It will be readily apparent that each warning device is very simple and also simple to mount on a truck body. It can be shipped knocked down with the connector 25 (and the feeler 26 secured thereto) disconnected from the arm 20.

When it is mounted, the top of the feeler 26 should extend a short distance above the high point of the truck body (represented by line 28). While the exact distance will depend upon the preferences of the truck owner or user, we recommend that it be a minimum of ¼ of an inch. Many users will want to make this dimension slightly more.

When the feeler 26 encounters an overhead obstruction 30, it will flex backwardly to an extent such as to slide under the obstruction. As it moves under the obstruction, the rubbing contact thereby created causes the warning device to emit sounds. The main sound actually will mainly emanate from plate 15 which serves as a sounding board, but it is generated by the scraping of the feeler and the fact that those vibrations are transmitted along the steel of the feeler and arm to the plate 15. These sounds can be heard by the driver in the cab 10 and he will be thereby warned to immediately stop the vehicle. He need not lean or peer out of the cab to make the determination. In the normal event he would already have been moving quite slowly, since he would have seen the overhead obstruction and would have slowed down until he determined whether the truck could move under the obstruction. If he hears no sound as the front of the cab moves under the obstruction, he knows that the feelers 26 are below the obstruction and therefore it is safe for him to proceed forwardly under the obstruction.

We claim:

1. A clearance warning apparatus for use with a vehicle having a cab and an enclosure at least partially behind the cab which enclosure extends to an elevation above the cab and has a front wall, said apparatus comprising:

a warning device attached to said front wall and comprising
a vertical mounting plate;
means for affixing said plate to said wall;
an arm having its proximal end affixed to said plate, said arm extending forwardly above said cab in an angular upwardly direction;
a flexible feeler, relatively thin compared to said arm, extending vertically from the distal end to said arm, said arm being threaded at its distal end;
a cap threaded onto said distal end, said feeler being secured to said cap; and
a plurality of small hollow spacers between said plate and said wall and positioning said plate away from said wall, said means extending through said spacers.

2. An apparatus as set forth in claim 1 wherein said arm is steel wire approximately ¼ inch in diameter; and said flexible feeler is spring steel wire approximately 3/32 inch in diameter.

3. An apparatus as set forth in claim 1, wherein two of said warning devices are used and are respectively affixed adjacent opposite sides of said front wall.

* * * * *